United States Patent [19]

Sommansson

[11] 4,195,207
[45] Mar. 25, 1980

[54] TELEPHONE PUSH BUTTON SWITCH ASSEMBLY HAVING SEQUENTIAL OPERATED CONTACT STRUCTURE

[75] Inventor: Peter S. E. Sommansson, Tyresö, Sweden

[73] Assignee: Telefonaktiebolaget L M Ericsson, Stockholm, Sweden

[21] Appl. No.: 866,251

[22] Filed: Jan. 3, 1978

[30] Foreign Application Priority Data

Jan. 8, 1977 [SE] Sweden ............................. 7701358

[51] Int. Cl.² .................... H01H 9/00; H04M 1/26
[52] U.S. Cl. ................... 200/1 B; 179/90 K; 200/5 R; 200/17 R; 200/153 LA
[58] Field of Search .......... 200/5 R, 5 E, 5 EA, 200/5 EB, 5 C, 1 R, 17 R, 18, 153 L, 153 LA, 153 P, 153 M, 175, 176, 283, 338, 1 B, 1 A; 179/90 K

[56] References Cited

U.S. PATENT DOCUMENTS

| Re. 27,863 | 1/1974 | Yano et al. ............. 200/153 LA X |
| 3,120,584 | 2/1964 | Grunfelder et al. ............. 200/292 X |
| 3,227,819 | 1/1966 | Winther ......................... 200/5 B |
| 3,676,810 | 7/1972 | Machida ..................... 200/5 E X |
| 3,706,863 | 12/1972 | Britton et al. ................. 200/5 E X |
| 4,071,715 | 1/1978 | Richard et al. ................. 179/90 K |

FOREIGN PATENT DOCUMENTS 2221249  11/1973  Fed. Rep. of Germany ........ 179/90 K

*Primary Examiner*—James R. Scott
*Attorney, Agent, or Firm*—Hane, Roberts, Spiecens & Cohen

[57] ABSTRACT

A slide included in the push button set of a telephone instrument reciprocable to actuate a number of contact devices in the set. Each contact device comprises a pair of movable contact arms associated with fixed contacts. The slide is disposed between two oppositely situated contact assemblies and comprises an arm having two oppositely directed wedge members. Each member has a longitudinal center portions and is provided on each side with a rounded camming surface. The reciprocating action of the slide is effected by a push button on the set, one camming surface then contacting a flange on a movable contact arm thus establishing a contact between this arm and the associated fixed contact. The camming surfaces on both sides of the wedge member are displaced relative to each other to provide a sequential contact action.

8 Claims, 11 Drawing Figures

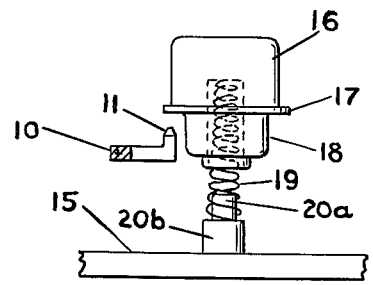
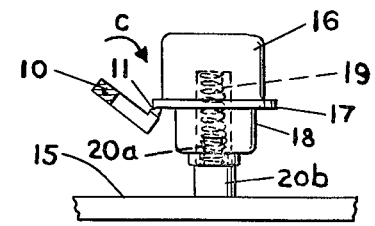
FIG. 6    FIG. 7
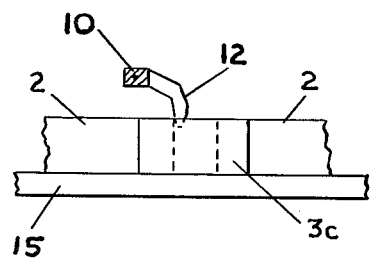
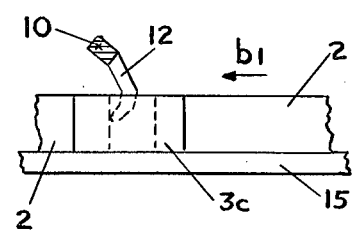
FIG. 8    FIG. 9
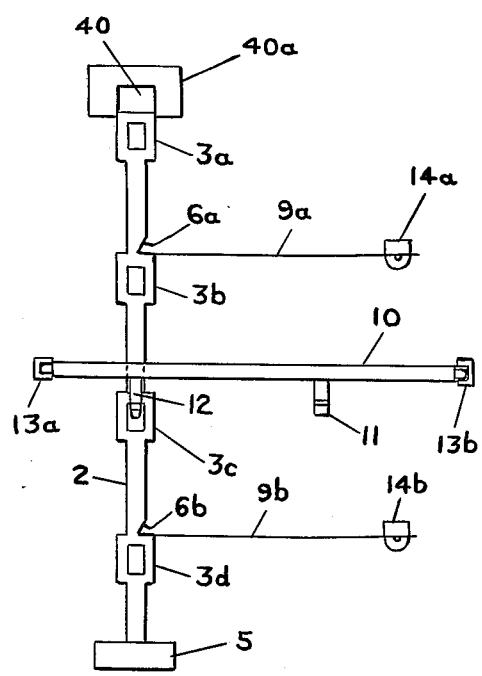
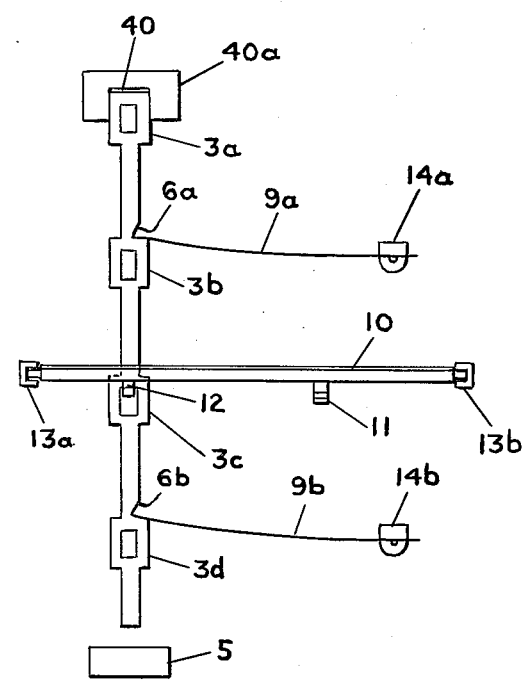
FIG. 10    FIG. 11

TELEPHONE PUSH BUTTON SWITCH ASSEMBLY HAVING SEQUENTIAL OPERATED CONTACT STRUCTURE

FIELD OF THE INVENTION

The present invention relates to a contact sliding element included in a telephone instrument of push button set type for activation of a number of contact devices when influenced by a push button on the push button set of the instrument. More precisely, the invention relates to a contact sliding element which upon actuation of the push button activates the contact devices in a time sequence for switching the instrument to a signalling position, the signalling taking place according to a tone selection or a pulse selection.

PRIOR ART

In modern telephone instruments of the push button type, the transmission of digit information from the instrument to the exchange is performed by sending tone signals which are generated by means of an oscillator device included in the instrument. The tone signal can then consist of a single tone or of a superposition of two tones in different combinations. The two tones are preferably generated by two different oscillators, one for each tone frequency. When a button on the instrument is actuated, the frequency determining components are connected in each oscillator and the superposition of the frequencies is carried out, the connection of the oscillator device being performed simultaneously with the short-circuiting of the micro telephone circuits of the instrument. Preferably, the connection of the oscillator device is carried out by means of mechanical connection devices comprising contact devices for disconnection (short circuiting) of the micro telephone circuits and connection of the oscillators or vice versa (signalling position and transmitting position, respectively). In this context it is desirable that, for example, at the short circuiting of the micro telephone circuits, a certain short time interval shall pass before connecting the oscillator circuits. This depends on the fact that the oscillators need a certain transient time before being connected to the line and before disconnection of the short circuited micro telephone circuits. Sometimes it is also desirable to connect a monitoring resistance so that a damped monitoring of the outgoing signal is obtained in the telephone receiver.

SUMMARY OF THE INVENTION

An object of the present invention is to provide a device in a telephone instrument of the push button type by means of which a number of contact devices included in the instrument can be activated in a certain time sequence when influenced by a push-button on the push-button set of the instrument.

BRIEF DESCRIPTION OF THE DRAWING

The invention will be described in detail with reference to the accompanying drawing, wherein FIG. 6 is an elevational view, partly in section, showing the assembled push-button actuator assembly in released position, FIG. 7 shows the assembly of FIG. 6 in actuated position, FIG. 8 is an elevational view, partly in section, showing the details of the engagement of of grip arm with the displaceable arm of the sliding element in normal position, FIG. 9 shows the assembly of FIG. 8 in actuated position, FIG. 10 is a top plan view of the construction in FIG. 1 in normal position, and FIG. 11 shows the construction in FIG. 10 in actuated position.

DETAILED DESCRIPTION

Figure 1:
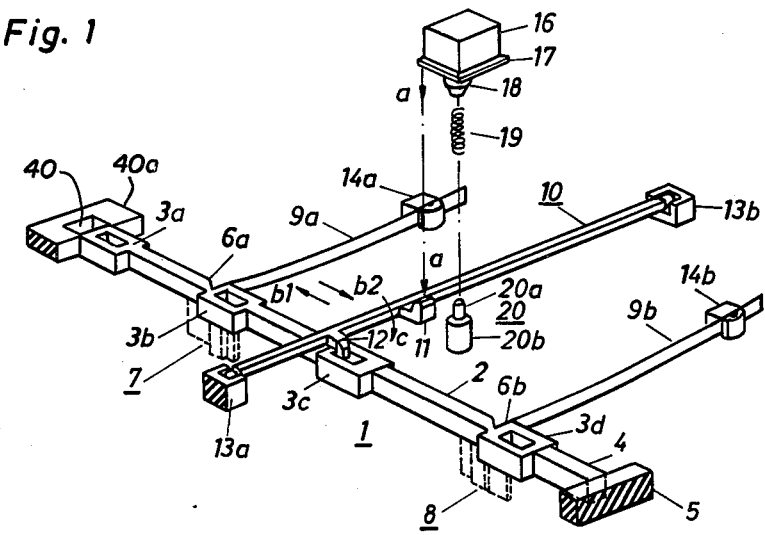
FIG. 1 shows a perspective view of the contact sliding element according to the invention and the manner of its co-operation with other elements in the instrument when actuated by a push button.

In the perspective view according to FIG. 1, the contact sliding element 1 together with associated operating and supporting elements are shown. The contact sliding element 1 comprises an arm 2 which is disposed on a base plate 15 (not shown in FIG. 1 but visible in FIGS. 8 and 9). The element 1 furthermore comprises frame-shaped parts 3a–3d each having a substantially rectangular outer contour and a rectangular opening. By means of guiding elements 33a and 33b, the contact sliding element 1 is secured in the transverse direction but can, perform a longitudinal movement as will be described below.

The guiding elements 33a, 33b are firmly secured to the base plate 15. The contact sliding element 1 further comprises two wedge parts 7, 8 which are firmly moulded to the arm 2 and depend therefrom. The element 1 is so disposed on the base plate that the wedge parts 7, 8 extend in a longitudinal groove (not shown) in the base plate, the wedge parts 7, 8 running completely free in the longitudinal direction of the arm 2 during the longitudinal movement of the element 1. A connection bar 10 is rotatably supported in two bearings 13a, 13b which are firmly fastened to the base plate. The connection bar 10 has an actuation arm 11 and a grip arm 12 including a bent part adapted to protrude into the opening of the frame-shaped part 3c as shown in FIGS. 8 and 9.

A push-button 16 includes a flange 17 and a depending hollow center pin 18 accommodating a helical spring 19. The hollow pin 18 together with the spring 19 are adapted to be pushed down as shown in FIG. 7 around the narrow part 20a of a rib 20 firmly moulded to the base plate, the narrow part 20a protruding into the push-button 16.

The lower end of the spring 19 bears against the upper plane surface of the wider part 20b of the rib 20. The push-button mechanism is described in detail in Swedish Pat. No. 402,654. When the button is depressed the flange 17 will abut against the upper part of the actuation arm 11, thus initiating the contact closure operation.

The contact sliding element arm 2 has two slits 6a, 6b forming a support for two leaf springs 9a, 9b which are firmly clamped by clamping elements 14a, 14b firmly moulded to the base plate.

Upon actuation of the button 16, movement of the contact sliding element is initiated. Namely, when button 16 is depressed the flange 17 travels in the direction of arrows a-a in FIG. 1 and abuts against actuation arm 11 to produce a rotation thereof in the direction of arrow C. The grip arm 12 will then displace the contact sliding element arm 2 in the direction of arrow b1 and the movement of the sliding element will continue until the button is completely depressed. The frame-shaped part 3a is guided in a slot 40 in a guiding element 40a fixedly secured to base plate 15. When the pressure actuation of the button 16 ceases, the contact sliding element 1 will perform an oppositely directed movement according to arrow b2 due to the action of the leaf springs 9a, 9b. The movement will continue until a protruding part 4 of the element 1 abuts against a front wall 5 of the base plate.

Figure 2:
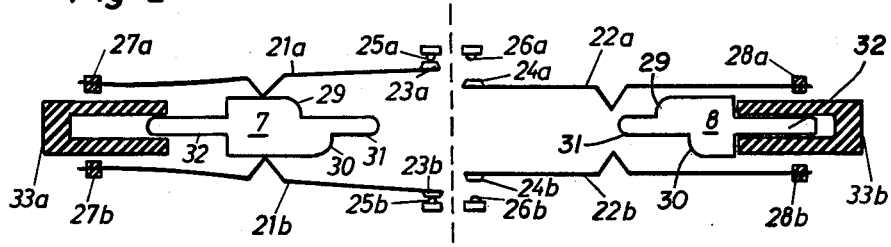
FIG. 2 shows from below two oppositely directed wedge-shaped members of the contact sliding element according to the invention and the manner of co-operation with contact devices in the instrument.

In FIG. 2, the wedge parts 7,8 on the contact sliding element 1 are shown in greater detail together with an associated contact spring assembly. The wedge part 7 comprises front and rear protruding parts 31 and 32, respectively, the ends of which are rounded. The part 7 further comprises a central portion joined by two curved surfaces 29,30 to the front part 31, the surfaces 29, 30 being displaced relative to each other. The guiding elements 33a, 33b are fixedly disposed on opposites sides of parts 7,8 respectively and are so shaped that the rear parts 32 of parts 7 and 8 travel between the shanks of the guiding elements 33a, 33b during movement of the sliding element 1.

The contact spring assemblies consist of four movable contact springs, two springs 21a, 21b associated with the wedge part 7 and two springs 22a, 22b associated with the wedge part 8. Furthermore, rigid contact elements 25a, 25b and 26a, 26b are, fastened to the base plate. The ends of the movable contact springs 21a, 21b, 22a, 22b are provided with respective contact elements 23a, 23b, 24a, 24b to enable contact with the rigid contact elements 25a, 25b, 26a, 26b. The movable contact springs 21a, 21b, 22a, 22b are firmly clamped by means of elements 27a, 27b, 28a, 28b to the base plate.

Upon actuation of the button 16, the contact sliding element 1 together with the parts 7,8 will, as described above, perform a longitudinal movement in the direction of arrow b1, noting FIGS. 1 and 9. The contact springs 22a, 22b will then be actuated by the part 8 in that the curved surface 30 first contacts the bend of the contact spring 22b and forces this outwards, whereby the contact elements 24b, 26b contact each other. A short time thereafter, the surface 29 will contact the bend of the contact spring 22a and the contact elements 24a 26a will contact each other. The movement of the sliding element in the direction of arrow b1 will at the same time, effect a disconnection of the contact element 23a, 25a and, a short time thereafter, a disconnection of the contact elements 23b, 25b. When the actuation of the button 16 ceases, the sliding element 1 will undergo movement by the action of the springs 9a, 9b in the direction of arrow b2, whereby the contacts 25a, 23a and 23b, 25b are connected and the contacts 24a, 26a, 24b, 26b are disconnected in the particular time sequence. The position of the curved surfaces 29, 30 and their displacement in relation to each other thus determine the movement of the contact spring assemblies and the mutual time displacement obtained.

Figure 3:
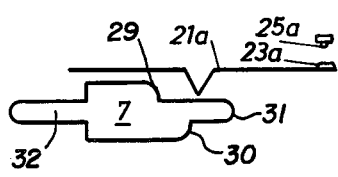
FIGS. 3–5 show different positions of a wedge-shaped member shown in FIG. 2 in order to further describe the operation of the contact sliding element.
Figure 4:
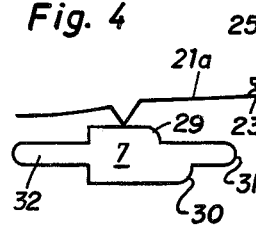
Figure 5:
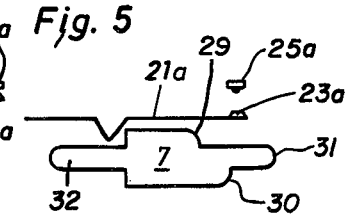

FIGS. 3–5 show three different positions of the part 7. FIG. 3 shows the displaced position when the front part 4 of the sliding element 1 is away from the front wall 5 of the base plate. FIG. 4 shows the position in which one contact spring 21a has been forced outwards by the curved surface 29 and when contact has been established between the contact elements 23a, 25a. FIG. 5 finally shows a position in which the contact sliding element 1 has been displaced to its initial position and the contact between the elements 23a, 25a has been broken. In corresponding manner, connection and disconnection of the contact elements 23b, 25b by the curved surface 30 of element 7 and connection and disconnection of the contact elements 24a, 26a and 24b, 26b, respectively associated with the other part 8 takes place.

In the embodiment according to FIG. 1, the movement of the sliding element is carried out by means of the grip arm 12 engaged in the opening in the frame-shaped part 3c. It is of course also possible to exclude the frame-shaped parts 3a–3d and the grip arm 12 and, instead, effect the movement by means of a gear transmission between the connection bar 10 and the sliding element 1.

We claim:

1. Switch apparatus comprising displaceable push-button means, a longitudinally slidable arm, means for displacing said arm between actuated and released positions in accordance with displaced and released positions of said push-button means, first and second oppositely directed wedge elements secured to said arm for displacement therewith, a pair of pivotal contact arms disposed on opposite sides of each of said wedge elements, each said wedge element having two offset actuator surfaces positioned with respect to said contact arms to pivotally move said contact arms in timed sequence as said longitudinally slidable arm travels between said actuated and released positions, and fixed contact means positioned adjacent said pivotal arms for undergoing opened and closed electrical switch contact therewith as said contact arms are pivotably moved and released.

2. Switch apparatus as claimed in claim 1 wherein said means for displacing said arm comprises a rotatable bar, means on said bar engageable by said push-button means for rotating said bar when the push-button means is displaced to actuated position, and protruding means on said bar engaging said slidable arm for displacing the slidable arm to actuated position when the bar is rotated, and resilient means acting on said arm to urge the same to released position thereof when the push-button means is released.

3. Switch apparatus as claimed in claim 1 wherein each said wedge element includes a longitudinally projecting part, said two actuator surfaces being longitudinally offset and extending in opposite directions from said longitudinally projecting part.

4. Switch apparatus as claimed in claim 3 wherein said pair of pivotal contact arms include actuator means respectively positioned on opposite sides of the associated wedge element for being contacted by said offset actuator surfaces.

5. Switch apparatus as claimed in claim 4 wherein said actuator surfaces are rounded cam surfaces.

6. Switch apparatus as claimed in claim 4 comprising fixed guide means for guiding each wedge part in the course of travel thereof.

7. Switch apparatus as claimed in claim 6 wherein each wedge part includes a second longitudinally projecting part extending in a direction opposite the first projecting part of the associated wedge part to permit longitudinal movement thereof while preventing transverse displacement.

8. Switch apparatus as claimed in claim 3 wherein said contact arms extend parallel to said longitudinally slidable arm and are pivotal about axes perpendicular thereto.

* * * * *